United States Patent
Chang et al.

(10) Patent No.: US 9,344,629 B2
(45) Date of Patent: May 17, 2016

(54) METHOD OF CAPTURING IMAGES AND IMAGE CAPTURING DEVICE USING THE METHOD

(71) Applicant: ALTEK SEMICONDUCTOR CORPORATION, Hsinchu (TW)

(72) Inventors: Wen-Yan Chang, Miaoli County (TW); Hong-Long Chou, Hsinchu County (TW); Yi-Hong Tseng, Hsinchu (TW); Tsan-Wei Wang, Taitung County (TW); Che-Lun Chuang, Hsinchu (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/524,009

(22) Filed: Oct. 27, 2014

(65) Prior Publication Data

US 2016/0080654 A1    Mar. 17, 2016

(30) Foreign Application Priority Data

Sep. 12, 2014 (TW) .............................. 103131485 A

(51) Int. Cl.
*H04N 5/232* (2006.01)
*H04N 5/235* (2006.01)
*H04N 5/225* (2006.01)
*G06K 9/46* (2006.01)

(52) U.S. Cl.
CPC .............. *H04N 5/23248* (2013.01); *G06K 9/46* (2013.01); *H04N 5/2254* (2013.01); *H04N 5/2327* (2013.01); *H04N 5/2353* (2013.01); *H04N 5/23267* (2013.01)

(58) Field of Classification Search
CPC ............ H04N 5/2258; H04N 5/23267; H04N 5/2327; H04N 5/23274; H04N 5/23248; H04N 5/2254; H04N 5/23253; G06K 9/46
See application file for complete search history.

(56) References Cited

U.S. PATENT DOCUMENTS

| | | | |
|---|---|---|---|
| 7,305,180 B2 * | 12/2007 | Labaziewicz | H04N 5/225 348/E5.024 |
| 2008/0143829 A1 * | 6/2008 | Takeda | G01S 17/89 348/143 |
| 2008/0211941 A1 * | 9/2008 | Deever | H04N 5/2258 348/262 |
| 2011/0080487 A1 * | 4/2011 | Venkataraman | H04N 5/2253 348/218.1 |
| 2014/0118584 A1 * | 5/2014 | Lee | H04N 5/2254 348/262 |

* cited by examiner

*Primary Examiner* — Timothy J Henn
(74) *Attorney, Agent, or Firm* — Bacon & Thomas, PLLC

(57) ABSTRACT

The present invention discloses a method of capturing images and an image capturing device using the method. The image capturing device has a first lens module and a second lens module having a view angle which is smaller than that of the first lens module. The method comprises: increasing an exposure time and reducing a light sensitivity value of the first lens module and capturing a first image by using the first lens module; reducing the exposure time and increasing the light sensitivity value of the first lens module and capturing a second image by using the second lens module; extracting a plurality of image features from the first image and the second image respectively and determining a region corresponding to the second image in the first image; and merging the second image into the region in the first image to generate an output image.

9 Claims, 3 Drawing Sheets

METHOD OF CAPTURING IMAGES AND IMAGE CAPTURING DEVICE USING THE METHOD

CROSS-REFERENCE TO RELATED APPLICATION

This application claims priority from Taiwan Patent Application No. 103131485, filed on Sep. 12, 2014, in the Taiwan Intellectual Property Office, the content of which are hereby incorporated by reference in their entirety for all purposes.

BACKGROUND OF THE INVENTION

1. Field of the Invention

The following description relates to a method of capturing images and an image capturing device using the method, in particular with respect to a method of improving the quality of photographic captured images and an image capturing device using the same by using lens having two different view angles to accomplish vibration reduction.

2. Description of the Related Art

Compared with the optical vibration reduction technique, extra optical mechanism is unnecessary to digital vibration reduction technique that is benefit to make the camera lighter and thinner and reduce cost; however, the digital zoom technique has the to-be-solved problems.

The general digital zoom technique will decrease the exposure time and increase the light sensitivity value of photographic lens, even it decreases the influence of vibration reduction caused by a user upon shooting images; whereas, high light sensitivity value is easy to generate noise in the images to degrade the image quality.

SUMMARY OF THE INVENTION

In view of the preceding technical problem, the purpose of the present invention is to provide a method of capturing images and an image capturing device using the same to accomplish effect of vibration reduction.

According the aforementioned shortcomings, the present invention provides a method for improving image quality which may be applicable to an image capturing device. The image capturing device has a first lens module, a second lens module, a feature extraction unit, an image zooming-deformation unit and an image merging unit. A view angle of the first lens module may be larger than that of the second lens module, and the method may comprise the following steps: (a) increasing an exposure time and reducing a light sensitivity value of the first lens module, and capturing a first image by using the first lens module; (b) reducing the exposure time and increasing the light sensitivity value of the second lens module, and capturing a second image by using the second lens module; (c) extracting a plurality of image features from the first image and the second image respectively by using the feature extraction unit, and generating an overlapping region corresponding to the second image in the first image based on the plurality of image features; (d) respectively zooming and deforming the overlapping region corresponding to the second image in the first image and the second image by the image zooming-deformation unit; and (e) merging the zoomed and deformed second image into the zoomed and deformed overlapping region in the first image by the image merging unit to generate an output image.

Preferably, the method of the present invention may further comprise: before step (d), correcting the second image based on the first image by using the image zooming-deformation unit and position correlations of the plurality of image features to align the first image and the second image with each other.

Preferably, the correcting step comprises using corresponding geometric correlation parameters of the first and the second lens modules.

Preferably, the method of the present invention may be performed under an image stabilization mode or a vibration reduction mode of the image capturing device.

According to the aforementioned purpose, the present invention may further provide an image capturing device. The image capturing device may comprise: a first lens module, a second lens module, a feature extraction unit, an image zooming-deformation unit and an image merging unit. The second lens module having a view angle which is smaller than that of the first lens module. The control unit may adapt to increase an exposure time and reduce a light sensitivity value of the first lens module, and reduce an exposure time and increase a light sensitivity value of the second lens module when receiving an image stabilization activating command and to control the first and the second lens modules to capture a first image and a second image respectively when receiving a shooting command. The feature extraction unit extracts a plurality of image features of the first and the second images respectively. The image zooming-deformation unit may adapt to determine an overlapping region in the first image which corresponding to the second image. The image merging unit may adapt to merge the second image into the overlapping region in the first image to generate an output image.

Preferably, the image capturing device may further comprise an input unit, which is used to receive an image stabilization activating command or a shooting command.

Preferably, the image capturing device may further comprise an input unit used to receive the image stabilization activating command or the shooting command.

Preferably, the image zooming-deformation unit may further correct the second image based on the first image by position correlations of the plurality of image features to align the first image and the second image with each other.

Preferably, the correcting step comprises using corresponding geometric correlation parameters of the first and the second lens modules.

Preferably, the image capturing device may further comprise a display unit used to display the output image.

BRIEF DESCRIPTION OF THE DRAWINGS

Hereinafter, embodiments of the present invention will be described in detail with reference to the accompanying drawings so that those skilled in the art to which the present invention pertains can easily realize the present invention, wherein.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

The exemplary embodiments of the present invention will be understood more fully from the detailed description given below and from the accompanying drawings of various embodiments of the invention, which, however, should not be taken to limit the invention to the specific embodiments, but are for explanation and understanding only.

As used herein, the term "and/or" includes any and all combinations of one or more of the associated listed items. When expressions such as "at least one of" precede a list of elements, they are modifying the entire list of elements and not modifying individual elements of the list.

Figure 1:
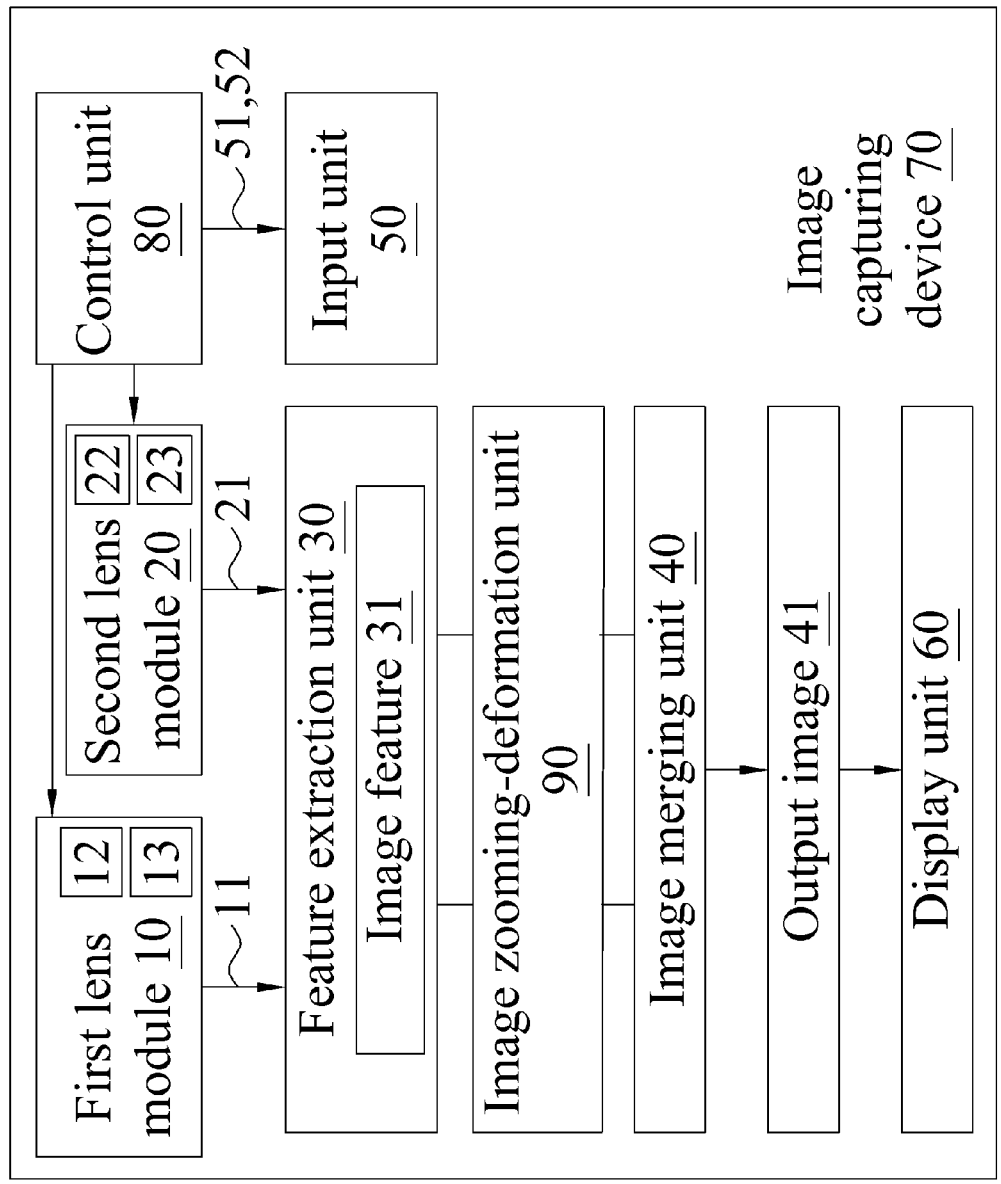
FIG. 1 is a block diagram of an embodiment of an image capturing device according to the present invention.

Please refer to FIG. 1 which is a block diagram of an embodiment of an image capturing device according to the present invention. As FIG. 1 shows, an image capturing device 70 comprises a first lens module 10, a second lens module 20, an input unit 50, a control unit 80, a feature extraction unit 30, an image zooming-deformation unit 90, an image merging unit 40 and a display unit 60.

Photographic range of the first lens module 10 is larger than that of the second lens module 20, and a view angle of the second lens module 20 is different from that of the first lens module 10. In practice, the first lens module 10 and the second lens module 20 are mounted on the same side of the case of the image capturing device 70 and both are guided toward the same direction. For example, the first lens module comprises a wide-angle lens module and the second lens module comprises a tele-focal lens module, and the focal-length of the second lens module is larger than that of the first lens module.

In practice, the first lens module 10 and the second lens module 20 respectively comprise an image capturing lens and an image sensor, the range of an image capturing angle of the image capturing lens of the first lens module 10 is larger than that of the second lens module 20. The aforementioned image sensor should be including an image sensor using charge-coupled device (CCD) or complementary metal-oxide-semiconductor (CMOS).

The input unit 50 is used to receive an image stabilization activating command 51 or a shooting command 52. For example, the input unit 50 may be a touch pad module, a key module or a combination thereof. In practice, when the input unit 50 is the touch pad module, the touch pad module is mounted on a surface of the a display unit 60, and a user is able to input the image stabilization activating command 51 or the shooting command 52 by touching the virtual key icon shown on the display unit 60; when the input unit 50 is the key module, the key module comprises a multi-directional key set and a shutter key, which are used to input the image stabilization activating command 51 or the shooting command 52 respectively.

The control unit 80, the feature extraction unit 30, the image zooming-deformation unit 90 and the image merging unit 40 may be executed by a way of software of a processing unit embedded in the image capturing device; for example, the control unit 80, the feature extraction unit 30, the image zooming-deformation unit 90 and the image merging unit 40 respectively belong to a program code which can be executed by the processing unit or via a way of hardware. The control unit 80, the feature extraction unit 30, the image zooming-deformation unit 90 and the image merging unit 40 are the specific circuits in the processing unit respectively, or are executed by a combination of software and hardware. For example, partial units are executed by the way of software, and the other units are executed by the way of hardware.

Figure 2:
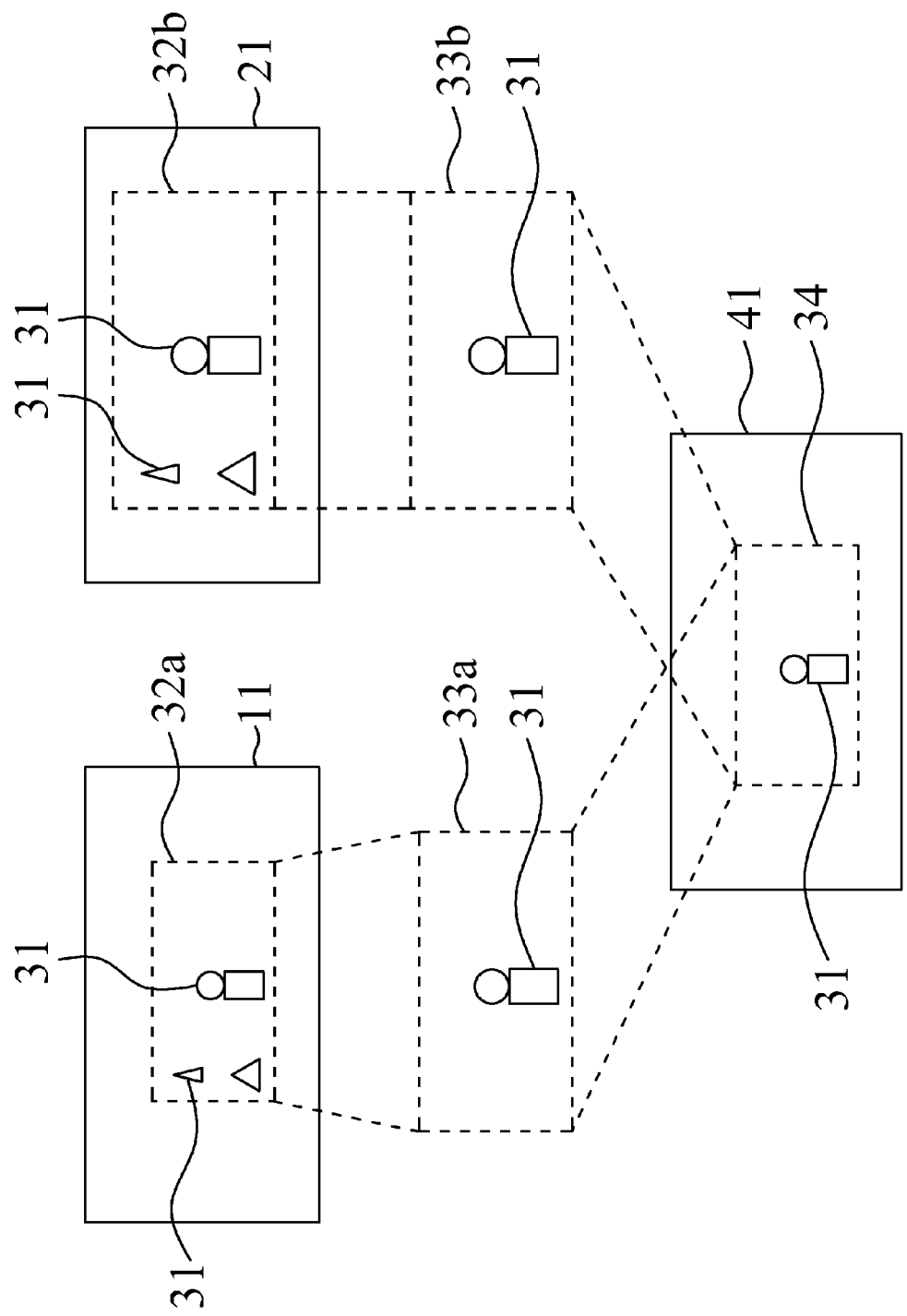
FIG. 2 is a schematic diagram of an embodiment of an image capturing device according to the present invention.

When the control unit 80 receives the shooting command 52, the control unit 80 controls the first lens modules 10 and the second lens modules 20 to capture a first image 11 and a second image 21 respectively. As FIG. 2 shows, the first images 11 and the second images 21 comprise images having diverse views respectively.

The feature extraction unit 30 extracts a plurality of image features 31 from the first image 11 and the second image 21 respectively, and the plurality of image features 31 are such as a region containing a larger brightness gradient.

The image zooming-deformation unit 90 determines an overlapping region in the first images 11 which corresponding to the second image 21 in the first image 11 based on the plurality of image features 31 extracted by the feature extraction unit 30, for example, the overlapping region including a region 32a comprised in the first image 11 and a region 32b comprised in the second image 21. In addition, the image zooming-deformation unit 90 conducts an image transformation process to the first images 11 and the second images 21, for example, a view transformation process. For instance, the image transformation process includes a positional relationship with the plurality of image features 31 to correct the second image 21 based on the first image 11 to align the two images with each other. Wherein, the image correcting comprises a relative geometric relationship parameter between the first and the second lens modules. Subsequently, the image zooming-deformation unit 90 further zooms in the size of the region 32a of the first image 11 to enable the region 32a of the first image 11 and the region 32b of the second image 32 to have the same size. Afterwards, respectively obtain the transformed region 33a of the first image 11 and the transformed region 33b of the second image 32.

The image merging unit 40 may adapt to merge the region 33a in the first image 11 and the region 33b in the second image 21 to generate an output image 41, wherein a region 34 of the output image 41 namely comprises clear image features 31 after being merged. The preceding image feature identifying technique and the image merging technique have been known by those skilled in the art, and the unnecessary details are therefore no longer given herein.

Because the photographic view of the first lens module 10 is larger than that of the second lens module, the captured image is not easy to be affected by user's vibration, therefore, the first image 11 is mainly used as the captured image, and is set to a long exposure time and a low light sensitivity value (i.e., ISO value). However, the region 32a corresponding to the second images 12 in the first image 11, which is shot by the first lens module 10, becomes vague easily due to the zooming. On the other hand, even as the second lens module 20 is set to a lower exposure time and a higher light sensitivity value (i.e., ISO value), the captured second image 21 retains more image details, it has more noises because of the higher light sensitivity value (i.e., ISO value). As a result, by the image merging unit 40 conducting merging the region 32b of the second image 21 and the region 32a of the first image 11, the definition (intelligibility) of the region 32a in the first image 11 can be further boost so as to generate the output image 41. The output image 41 has a wider shooting view and can maintain a better definition in the specific area, and finally, the display unit 60 displays the captured output image 41.

Figure 3:
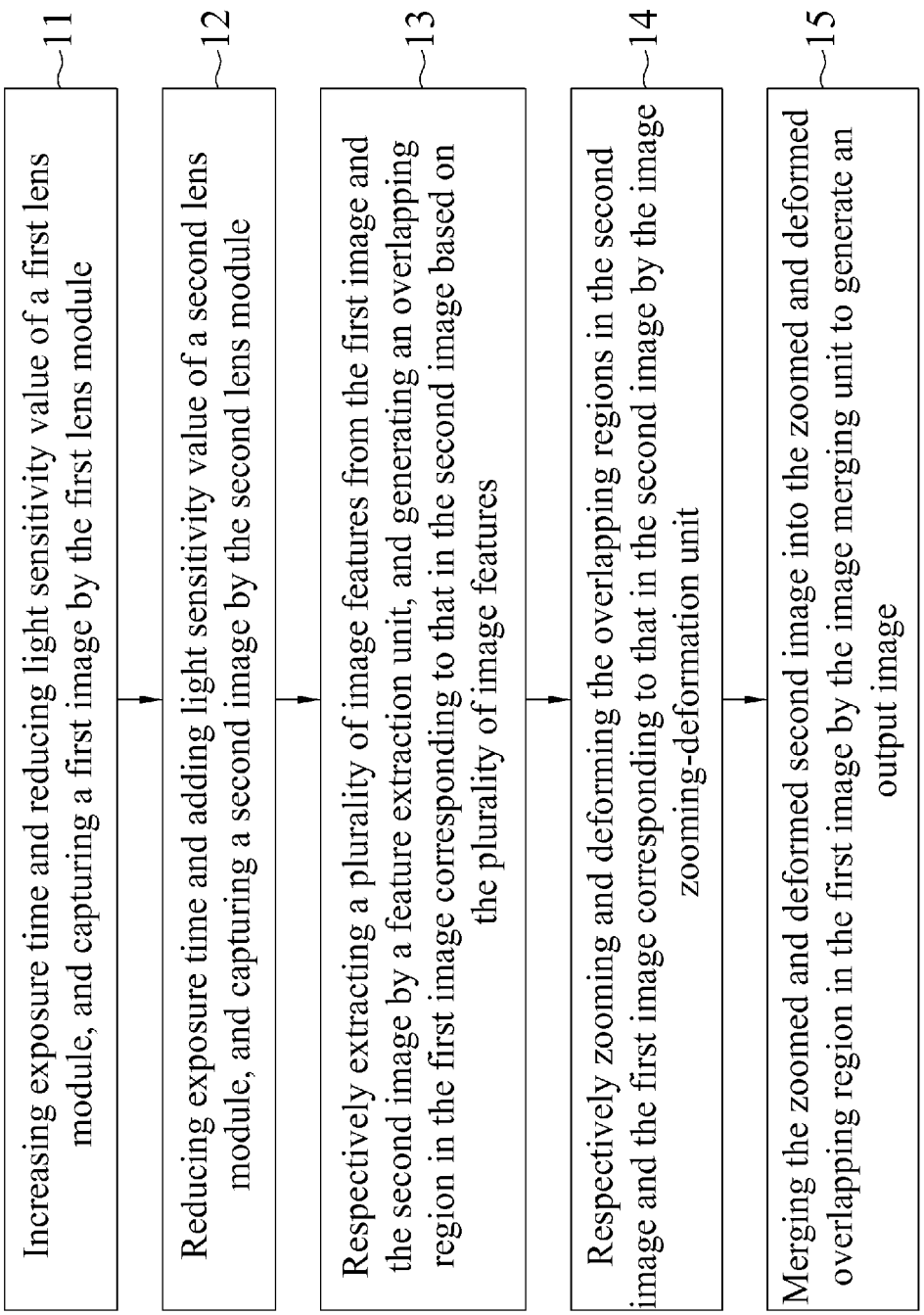
FIG. 3 is a flow chart of a method for improving image quality according to the present invention.

Please refer to FIG. 3, which is a flow chart of a method for improving image quality according to the present invention. In the FIG. 3, the method for improving the image quality is applicable to an image capturing device having a first lens module, a second lens module and a processing unit. As FIG. 1 shows, a photographic range of the first lens module 10 is larger than that of the second lens module 20, and a view angle of the second lens module 20 is different from that of the first lens module 10. The method is generally executed in an image stabilization mode or a vibration reduction mode of the image capturing device, which comprises the following steps.

S11: Increasing the exposure time 12 and reducing the light sensitivity value 13 of a first lens module 10, and capturing a first image 11 by using the first lens module 10.

S12: Reducing the exposure time 12 and increasing the light sensitivity value 13 of a second lens module 20, and capturing a second image 21 by using the second lens module 20.

S13: Respectively extracting a plurality of image features 31 from the first image 11 and the second image 21 by using a feature extraction unit 30, and generating an overlapping region corresponding to the second image 21 in the first image 11 based on the plurality of image features 31.

S14: Respectively zooming and deforming the overlapping region corresponding to the second image 21 in the first image 11 and the second image 21 by using the image zooming-deformation unit 90.

S15: Merging the zoomed and deformed second image 21 into the zoomed and deformed overlapping region in the first image 11 by using the image merging unit 40 to generate an output image 41.

The image of the region in the first image 11 is vaguer than that in the second image 21, and the image of the second image 21 has more noises than the first image 11.

In practice, the method for improving the image quality may further comprise conducting an image transformation process to the second image 21 based on a data of correcting by using the image zooming-deformation unit 90 to generate a processed second image 21 which is consistent with the image of the region in the first image 11 before conducting the S14, and merging the processed second image 21 into the region in the first image 11 by the image merging unit 40 to generate the captured output image 41 in S14.

The correcting step comprises using corresponding geometric correlation parameters of the first lens modules 10 and the second lens modules 20, and the image transformation process may comprise a view transformation process. Note that the method may be performed under an image stabilization mode or a vibration reduction mode of the image capturing device.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A method of capturing images applicable to an image capturing device having a first lens module, a second lens module, a feature extraction unit, an image zooming-deformation unit and an image merging unit, wherein a view angle of the first lens module being larger than that of the second lens module, and the method comprising:
   (a) increasing an exposure time and reducing a light sensitivity value of the first lens module, and capturing a first image by using the first lens module;
   (b) reducing an exposure time and increasing a light sensitivity value of the second lens module, and capturing a second image by using the second lens module, wherein the light sensitivity value of the second lens module is larger than that of the first lens module;
   (c) respectively extracting a plurality of image features from the first image and the second image by using the feature extraction unit, and generating an overlapping region corresponding to the second image in the first image based on the plurality of image features;
   (d) respectively zooming and deforming the second image and the overlapping region corresponding to the second image in the first image by the image zooming-deformation unit; and
   (e) merging the zoomed and deformed second image into the zoomed and deformed overlapping region in the first image by the image merging unit to generate an output image.

2. The method of claim 1, further comprising:
   before step (d): correcting the second image based on the first image by the image zooming-deformation unit and position correlations of the plurality of image features to align the first image and the second image with each other.

3. The method of claim 2, wherein the correcting step comprises using corresponding geometric correlation parameters of the first and the second lens modules.

4. The method of claim 1, wherein the method is performed under an image stabilization mode or a vibration reduction mode of the image capturing device.

5. An image capturing device, comprising:
   a first lens module;
   a second lens module, having a view angle which is smaller than that of the first lens module;
   a control circuitry, adapted to increase an exposure time and reduce a light sensitivity value of the first lens module, and reduce an exposure time and increase a light sensitivity value of the second lens module when receiving an image stabilization activating command and to control the first and the second lens modules to capture a first image and a second image respectively when receiving a shooting command;
   a feature extraction circuitry used to respectively extract a plurality of image features of the first and the second images;
   an image zooming-deformation circuitry, adapted to determine an overlapping region in the first image which corresponding to the second image; and
   an image merging circuitry, adapted to merge the second image into the overlapping region in the first image to generate an output image.

6. The image capturing device of claim 5, wherein the image capturing device further comprises an inputter used to receive the image stabilization activating command or the shooting command.

7. The image capturing device of claim 5, wherein the image zooming-deformation circuitry further corrects the second image based on the first image by position correlations of the plurality of image features to align the first image and the second image with each other.

8. The image capturing device of claim 7, wherein the correcting of the second image further comprises using corresponding geometric correlation parameters of the first and the second lens modules.

9. The image capturing device of claim 5, wherein the image capturing device further comprises a display unit used to display the output image.

* * * * *